F. G. WALKER.
UNIVERSAL JOINT.
APPLICATION FILED JAN. 31, 1917. RENEWED APR. 25, 1919.
1,308,212.
Patented July 1, 1919.
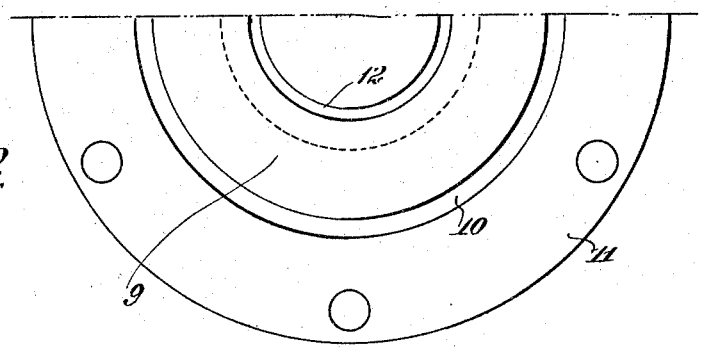
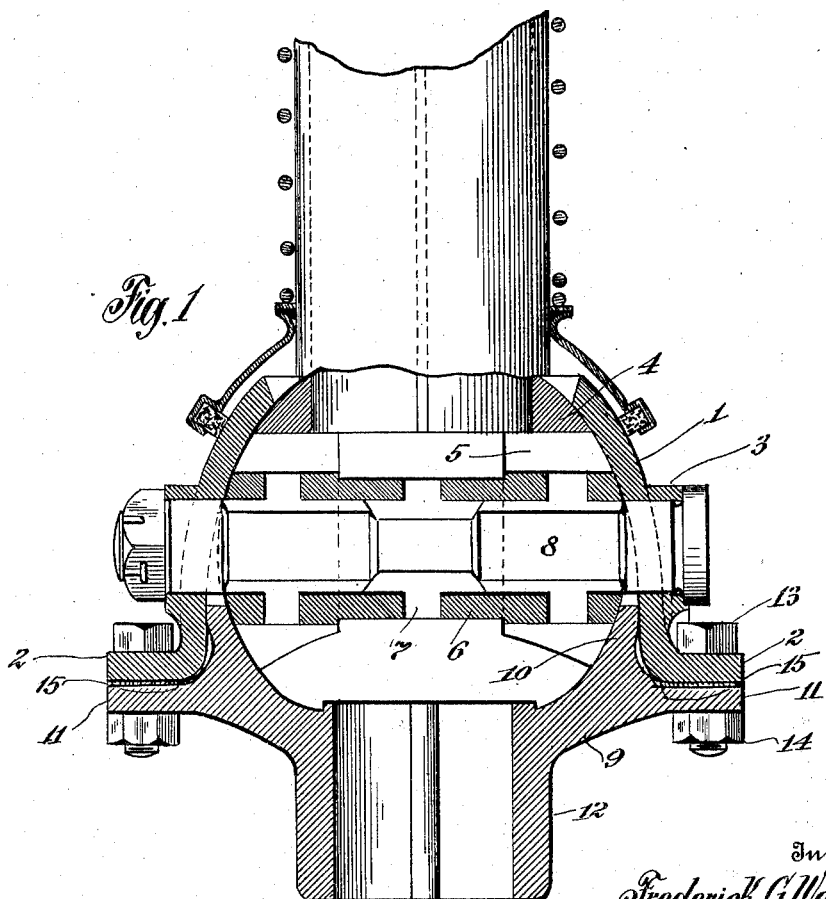
Inventor
Frederick G. Walker

UNITED STATES PATENT OFFICE.

FREDERICK G. WALKER, OF DETROIT, MICHIGAN.

UNIVERSAL JOINT.

1,308,212.  Specification of Letters Patent.  Patented July 1, 1919.

Application filed January 31, 1917, Serial No. 145,610. Renewed April 25, 1919. Serial No. 292,698.

*To all whom it may concern:*

Be it known that I, FREDERICK G. WALKER, a citizen of the United States of America, residing at Detroit, in the county of Wayne and State of Michigan, have invented certain new and useful Improvements in Universal Joints, of which the following is a specification, reference being had therein to the accompanying drawings.

Any practical or serviceable universal joint consisting of comparatively few parts is desirable, as the joint parts can be more readily assembled and undoubtedly provide a more durable universal joint. Such a joint I have devised and my improvement particularly resides in combining a cap and ball retaining member, these elements being disclosed by my Patent No. 1,181,625 granted May 2, 1916.

The present invention will be hereinafter particularly referred to and then claimed, and reference will now be had to the drawing, wherein—

Figure 1 is a longitudinal sectional view of a universal joint in accordance with my invention, and Fig. 2 is a plan of a portion of a combined cap and ball retaining member.

In the drawing, 1 denotes a socket member, either of pressed steel or a drop forging, and this member has a peripheral flange 2 and opposed trunnion bosses 3.

4 denotes a ball member within the socket member 1 and this ball member is slotted to provide bearing faces 5.

6 denotes a trunnion member in the slot of the ball member 4 and engaging the bearing faces 5 of said member. The trunnion member 6 is ported, as at 7 for lubricating purposes and extending through the trunnion member is a trunnion bolt or pin 8 mounted within the bosses 3 of the socket member 1.

9 denotes a combined cap and ball retaining member and this element has a somewhat semi-spherical skirt 10, secured to a flange 11 and a shaft coupling sleeve 12. The peripheral flange 11 is adapted to be connected to the flange 2 of the socket member 1 by bolts 13, nuts 14 or other fastening means, with a laminated shim 15 interposed between the flanges so that portions of the shim may be removed to permit of the combined cap and ball retaining member being adjusted to compensate for wear between the contacting faces of the skirt 10 and the ball member 4. With the skirt 10 extending into the socket member 1 on to the ball member 4, said ball member is adjustably held and normally seated in the socket member, and with the shaft connected to the coupling sleeve 12, the socket member 1 is closed by the ball member 4 and the combined cap and ball retaining member 9, thus permitting of a lubricant being easily retained within the socket member. It will be noted that the inner end of the shaft coupling sleeve 12 is set in a plane outside of the plane of the peripheral flange 2 of the socket member 1, thus permitting of the skirt 10 providing sufficient clearance for the ball member 4 when adjusted within the socket member.

What I claim is:—

In a universal joint, a socket member, a ball member having a universal movement therein, and a combined cap and ball retaining member having a peripheral flange connected to said socket member, a shaft coupling sleeve centrally thereof, and a skirt extending into said socket member, said skirt having a wall meeting the inner end of said sleeve and serving as a continuation of the inner wall of said socket member, and against which said ball member rides during universal movement thereof.

In testimony whereof I affix my signature in the presence of two witnesses.

FREDERICK G. WALKER.

Witnesses:
ANNA M. DORR,
KARL H. BUTLER.

Copies of this patent may be obtained for five cents each, by addressing the "Commissioner of Patents, Washington, D. C."